Inventor:
Rolf Möller

Feb. 22, 1966 R. MÖLLER 3,236,943
METHOD OF AND APPARATUS FOR RECORDING AND REPRODUCING TELEVISION AND LIKE WIDEBAND SIGNALS
Filed July 7, 1961 5 Sheets-Sheet 2

Jnventor:
Rolf Möller

Jnventor:
Rolf Möller

Feb. 22, 1966 R. MÖLLER 3,236,943

METHOD OF AND APPARATUS FOR RECORDING AND REPRODUCING TELEVISION AND LIKE WIDEBAND SIGNALS

Filed July 7, 1961

5 Sheets-Sheet 4

Jnventor:
Rolf Möller

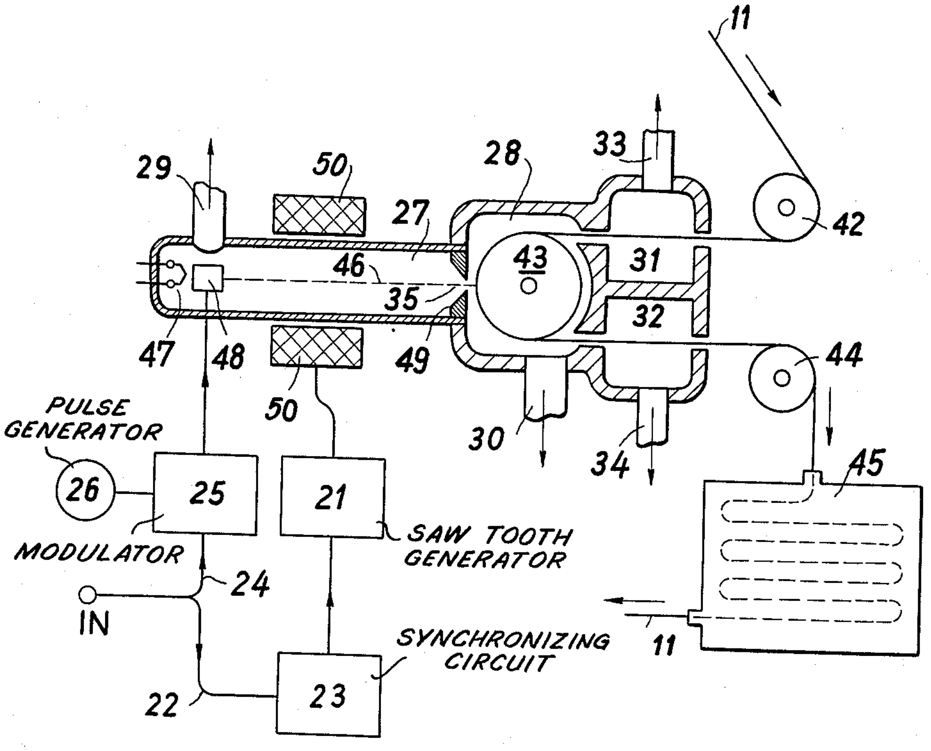
Fig. 7
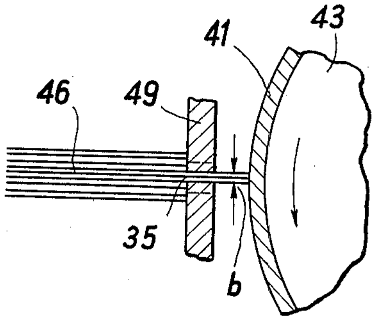
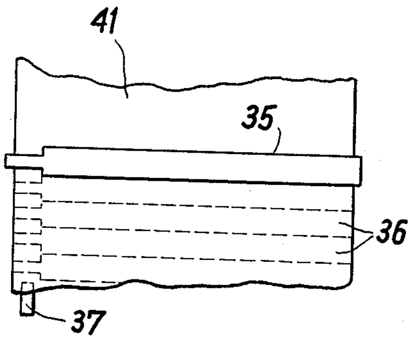
Fig. 8
Fig. 9
Jnventor:
Rolf Möller

United States Patent Office
3,236,943
Patented Feb. 22, 1966

3,236,943

METHOD OF AND APPARATUS FOR RECORDING AND REPRODUCING TELEVISION AND LIKE WIDEBAND SIGNALS

Rolf Möller, Darmstadt-Eberstadt, Germany, assignor to Fernseh G.m.b.H., Darmstadt, Germany
Filed July 7, 1961, Ser. No. 125,630
Claims priority, application Germany, July 7, 1960, F 31,603
15 Claims. (Cl. 178—6.7)

Figure 1:
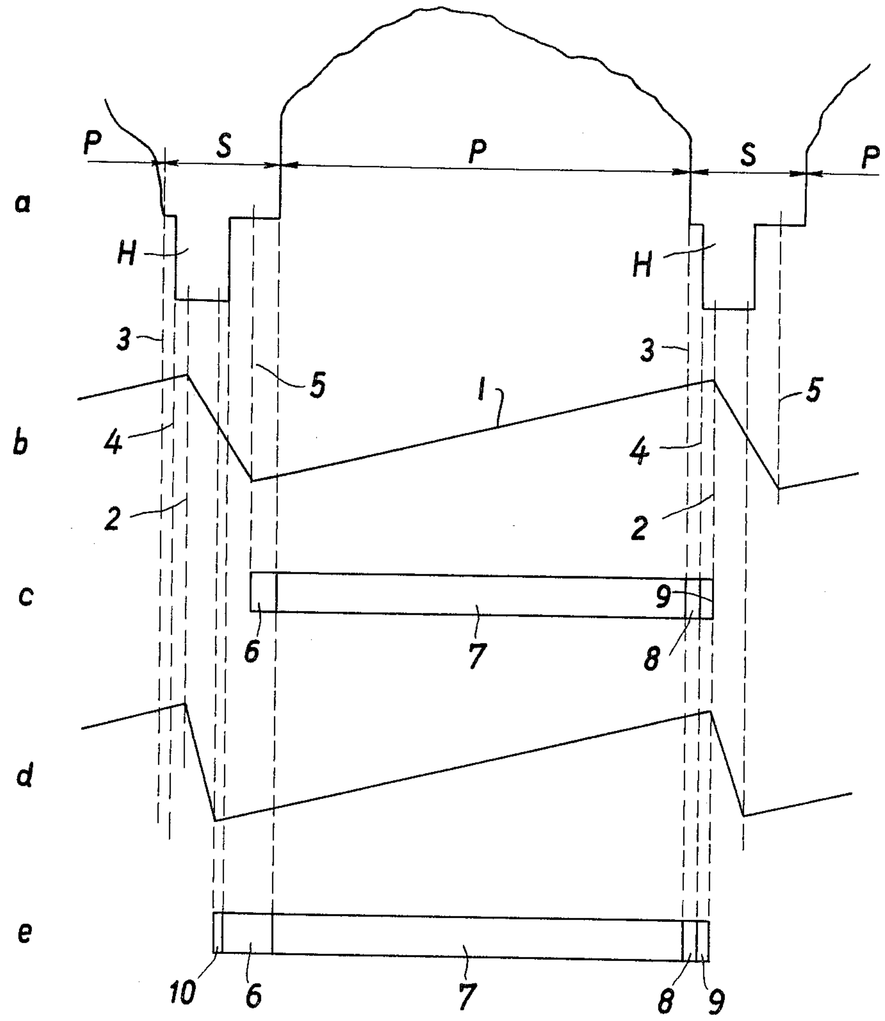

In television broadcasting operations the problem of storing television programs for long periods in order to be able to transmit them at a later time is very important. By the use of such recordings it becomes possible to produce in advance a part or the whole of a program and also to radiate programs from transmitters to which direct transmission of the television signal, for example, over microwave links, is impossible.

Television programs have been stored by displaying television pictures on the screen of a cathode ray tube and recording these pictures on cinematographic film by means of a cinematographic camera. In the practical operation of the process a series of difficulties have been encountered. In order to record complete television pictures, repetitive at 25 c./s. on film which is held stationary during the exposure it would be necessary to pull down the film through one picture height within the duration of one vertical blanking period of the television signal, which for the 625-line European standard has a duration of only 1.2 ms., or to image the television picture in register with a continuously moving film by means of a special optical compensator. In this latter process it has already been proposed to record the two fields of a complete television picture each with a duration of 1/50 second, so that they are interlaced with one another on the same area of film. All such methods of film recording have been found difficult to carry out in practice owing to the high standard of mechanical accuracy which is required and these methods have so far not been generally adopted. The solution which has been adopted is to record only every second field of the interlaced television signal and to pull down the film during the other field. This process necessarily involves a 50% loss in resolution in the vertical direction.

The processing of the exposed film, that is, its development, and if necessary the printing and development of the print, also introduces the danger that the gradation of the pictures will undergo some alteration, so that the pictures re-transmitted from the film record often display false gradation.

In another known process it has therefore been sought to employ for the recording of television signals the methods of magnetic recording already found to be valuable in sound recording. Because of the very great difference between the frequency band of a television signal and that of an audio signal (for example, 5 mc./s. for a 625-line signal as against 15 kc./s.) the relative velocity of tape and transducer head must then be very high. Owing to the fact that for efficient recording of high signal frequencies the transducer head must be in actual contact with the tape the high relative speed leads to the appearance of considerable wear. In order to reduce the longitudinal speed of movement of the magnetic tape, and thus the length of tape necessary for a record of given duration, it has been proposed to effect the recording in transverse tracks extending across the width of the tape by means of a plurality of magnetic transducer heads arranged about the circumference of a revolvable head drum. This system introduces new difficulties in producing the necessarily very accurate setting-up of the heads in the required equi-angular positions and in the appearance of streaking in the reproduced picture due to non-uniform responses of the several transducer heads. In addition, the editing of a magnetic record is difficult owing to the intrinsic invisibility of the record.

It is an object of the invention to overcome the aforesaid difficulties and to provide improved methods and means for recording a television or like signal.

According to the present invention there is provided the method of recording a television or like signal which comprises modulating a beam of charged particles by said signal so that the intensity of said beam is periodically varied between approximately constant maximum and minimum values to form a train of pulses of which the repetition rate and/or duration varies in accordance with the amplitude of said signal, causing said beam to initiate or produce persistent alterations in an elongated record member arranged for movement in the direction of its major dimension and cyclically deflecting said beam laterally with respect to said record member with a repetition period equal to the duration of an integral number of signal periods of said discontinuous signal.

By the expression "a television or like signal" used in the present specification and in the accompanying claims is to be understood a signal containing periodically repetitive portions containing a constant amount of information, such as the suppression intervals of a television signal or the portions of a radar video signal corresponding to the periods of closure to the receiver of the TR switch.

The method of recording in accordance with the invention possesses the advantage that the amplitude of the signal reproduced from the record depends only upon the repetition rate and/or duration of the recorded pulses and not upon their amplitude. It is however a simple matter to record pulses of which the repetition rate and/or duration is exactly proportional to the amplitude of a controlling signal and the gradation of a recorded television signal may thus be strictly preserved independently of the amplitude characteristic of the recording process. It is only necessary for the material comprising the record member to be capable of exhibiting two distinguishable conditions, corresponding to the maximum and minimum intensities of the recording beam of charged particles. It is therefore possible to employ as the record member any substance in which a detectable persistent alteration is initiated or produced by the impact of a beam of charged particles.

The production of the alteration in the record member is preferably effected by the action of a beam of charged particles impinging directly upon the member. However, it is also within the scope of the present invention to employ means whereby the beam of charged particles influences the record member indirectly. Thus the beam of charged particles may give rise to electromagnetic radiation, such as light or X-rays, which in turn produces or initiates a persistent alteration in the material comprising the record member.

An advantage obtained by the use of the present invention is that only the relatively slow longitudinal movement of the record member needs to be effected by mechanical means, while the rapid movement in the transverse direction is effected electronically.

Figure 2:
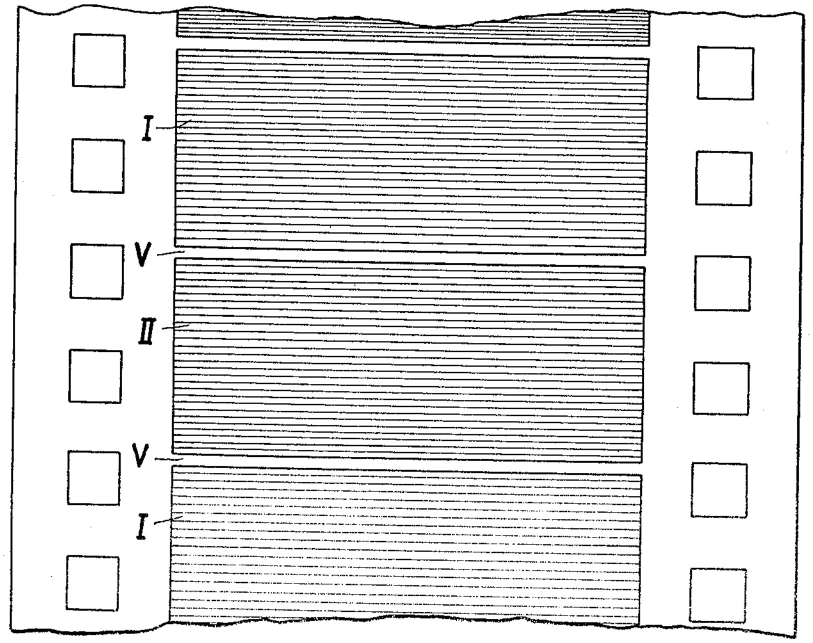
Figure 3:
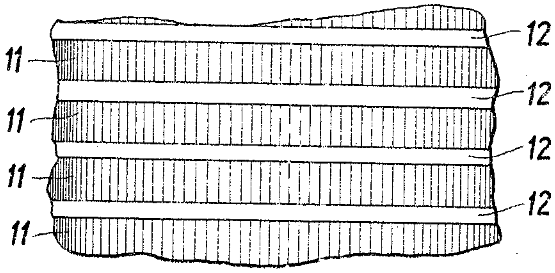
Figure 4:
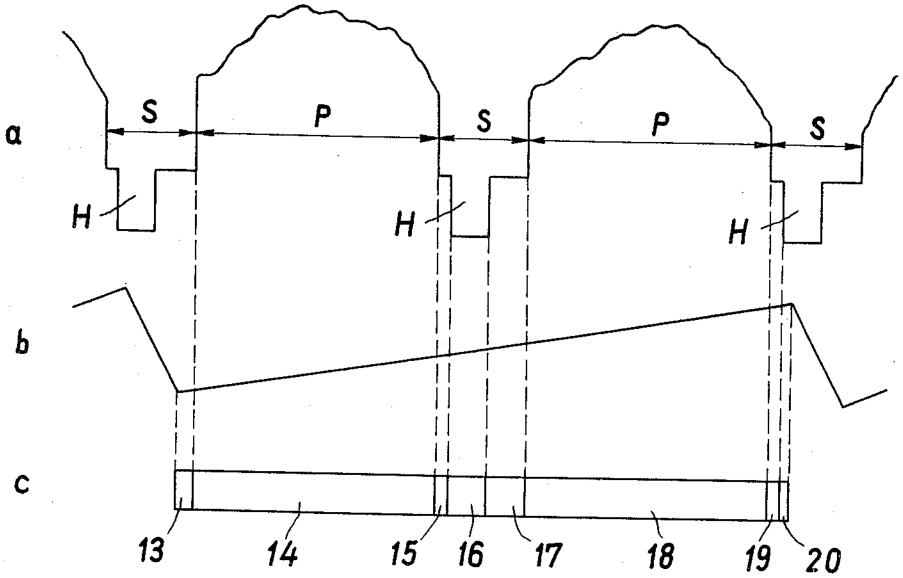
Figure 5:
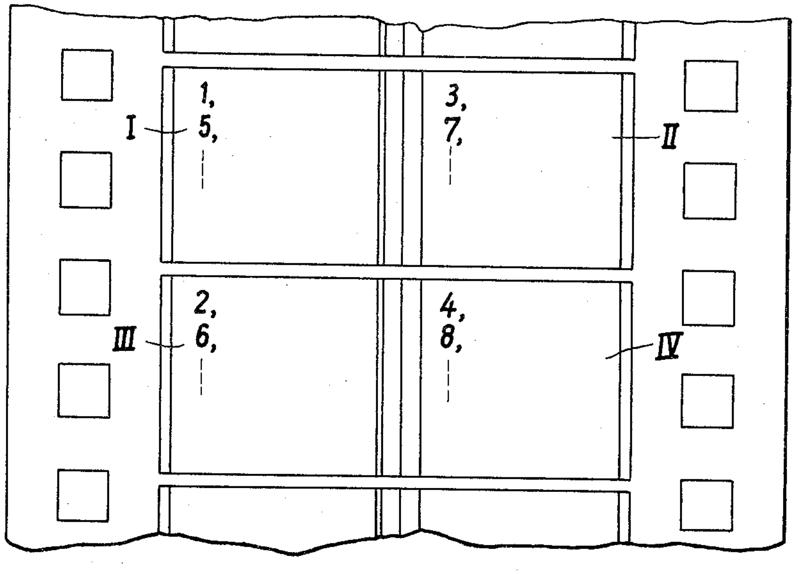

The invention itself, however, both as to its construction and its method of operation together with additional objects and advantages thereof, will be best understood from the following description of specific embodiments when read in connection with the accompanying drawings, comprising FIGURES 1 to 9, of which:

FIGURE 1 comprises a series of diagrams illustrating a method of recording in accordance with the present invention, FIGURE 2 illustrates a record produced as explained with reference to FIGURE 1, FIGURE 3 represents an enlarged detail of the record shown in FIGURE 2, FIGURE 4 comprises a series of diagrams illustrating another method of recording in accordance with the present invention, FIGURE 5 illustrates a record produced as explained with reference to FIGURE 4, FIGURE 6 comprises a series of diagrams illustrating methods of modulating a beam of charged particles which may be used in carrying out the present invention, FIGURE 7 is a schematic diagram illustrating one embodiment of apparatus for carrying out the method according to the invention, FIGURE 8 is a schematic diagram illustrating a detail of a modification of the apparatus shown in FIGURE 7, and FIGURE 9 shows the effect upon a record of the modification described in relation to FIGURE 8.

FIGURE 1 illustrates the method according to the invention for recording a television signal for the case where each transverse track recorded corresponds to one repetition period of a television signal. In this case the timing and duration of the flyback of the beam of charged particles is so chosen that at either the beginning or at the end of each track, or at both ends, the recorded signal reaches the levels corresponding to the tips of the horizontal synchronizing impulses and to the suppression level. Diagram *a* of FIGURE 1 shows the variation in signal amplitude during rather more than one line period of a television signal which is to be recorded by the method according to the invention.

Between the signal portions P which correspond to the picture content of the signal there occur the suppression periods S. During these periods the level of the signal during the pre- and post-synchronization suppression periods is at the suppression level which differs from picture black by a predetermined amount. The suppression level is standardized at some 30% of the total range of signal amplitudes. During these suppression intervals there occur the horizontal synchronizing impulses H, the tips of which have zero amplitude.

The diagram given as FIGURE 1*b* shows how the timing and duration of the flyback process of the deflection generator, which controls the deflection of the recording beam of charged particles, is to be chosen so that not only is the picture content portion P of the signal recorded, but also signal portions having the suppression level and the level of the tips of the synchronizing impulses. For this purpose the initiation of the flyback process is delayed until after the leading edge of the horizontal synchronizing impulse has occurred, so that at the end of each recorded track the recorded signal will have in turn the suppression level and the synchronizing level. Thus the pre-synchronizing suppression interval and the full amplitude range of the horizontal synchronizing signal are recorded. From these, in a manner which is discussed later, the complete synchronizing signal may be reconstructed so that when the recorded signal is reproduced a television signal is obtained which is continuous even during the flyback intervals in the scanning process used to derive the signals from the record. This operation is illustrated by solid line 1 in diagram 1*b* which represents the deflection waveform used to control the movement of the recording beam. It will be seen that the flyback process is initiated at an instant, represented by the vertical broken lines 2, which is not only later than the commencement of the suppression period, indicated by vertical broken lines 3 but is later than the leading edge of the horizontal synchronizing impulses H, represented by vertical broken line 4. When the flyback process commences the recording beam is of course suppressed and recording ceases until the instant, represented by vertical broken lines 5, at which the scanning stroke recommences.

Each recorded track thus commences as shown in diagram 1*c* with a portion 6 representing the suppression level of the television signal. This is followed by the major portion representing the recorded picture signal. At the end of the track there occur in succession a portion 8 representing the suppression level and a portion 9 representing the synchronizing level.

If, however, as shown in diagram 1*d*, the flyback of the recording beam is further shortened, so that it lies wholly within the period of the horizontal synchronizing pulses H, then, as shown in diagram 1*e*, each recorded track will commence with a portion 10 representing the synchronizing level, followed by a portion 6 representing as before the suppression level. There then follows the portion 7 representing the recorded picture signal and the track terminates with portions 8 and 9 representing respectively the suppression and synchronizing levels. Thus each track will begin and end with records representing the synchronizing and suppression levels.

On the elongated record member, owing to its movement in the longitudinal direction the tracks, each corresponding to one line of the television signal and including portions representing the suppression level and at least one edge of the line synchronizing signal are traced one below the other, as is illustrated in FIGURE 2, in which is illustrated a short portion of cinematographic film which here forms the record member.

After all the lines contained in the first field of one frame of a television signal have been recorded one after the other as indicated at I, where the number of lines shown is less than that which would be used in practice for the sake of clarity of illustration, there follows a vertical blanking interval V containing the vertical synchronizing signal and then the lines of the second field are recorded at II.

The individual tracks may sometimes be recorded upon the record member either immediately following one another so as to be contiguous or, as indicated in the greatly enlarged portion of a record shown in FIGURE 3, the tracks illustrated by shaded areas 11 may be longitudinally spaced from one another by unrecorded spaces 12. The distance between successive tracks may, as shown, be equal to half the width of a track.

In carrying out the invention, it is alternatively possible to record in each transverse track on the record member an integral number of signal repetition periods. FIGURE 2 illustrates the application of the invention to the recording of a television signal for the case where each recorded track contains the picture content of two successively scanned lines of the television signal.

Diagram *a* of FIGURE 4 illustrates rather more than two successive lines of a television signal, consisting of picture signal portions P separated by suppression intervals S containing horizontal synchronizing intervals H. Diagram 4*b* illustrates the deflection of the beam of charged particles used to effect the recording. It will be seen that the period of deflection is exactly equal to two line periods of the television signal. For a 625-line television signal, in which the line repetition frequency is 15,625 lines per second, the deflection repetition rate for the recording beam will therefore be 7,812.5 c./s. The recording beam is, as usual, rendered inoperative during the flyback process, which has a timing and duration such that it commences after the leading edge of each alternate horizontal synchronizing signal and is concluded prior to the end of the suppression interval. Each recorded track therefore, as illustrated by diagram 4*c* commences with a portion 13 corresponding to the suppression level, followed by a portion 14 containing the picture content of one line. This in turn is followed by a portion 15 corresponding to the suppression level, a portion 16 which corresponds to the synchronizing level, a portion 17 of the suppression level, a portion 18 containing the picture content of the next successive line and finally portions 19 and 20 representing the suppression and synchronizing levels. In this case, however, it is not strictly necessary that the signal level corresponding to the suppression level and the edge of the synchronizing signal be recorded for each line of the television signal, since the restoration of those portions of the television signal which are bypassed during the flyback of the deflection process for the recording beam may be effected by making use of the completely recorded synchronizing signal which occurs at the centre of each recorded track, as will be described later.

Where, as described with relation to FIGURE 4, two successive lines of a television signal are recorded in each transverse track of the recording, then each complete television picture is divided among four fields, as illustrated in FIGURE 5. Here field I will contain the 1st, 5th, 9th etc. lines, field II lying next to field I will contain the 3rd, 7th, 11th etc. lines, field III, situated below field I will contain the 2nd, 6th, etc. lines and field IV, situated below field II, will contain the 4th, 8th etc. lines of a complete television picture.

The variation of the intensity of the beam of charged particles periodically with a duration and/or repetition rate dependent upon the amplitude of the signal to be recorded may be effected in more than one manner. Thus the speed of deflection may be constant throughout the working stroke and the intensity of the beam may be varied in accordance with the amplitude of the signal to be recorded. Some of the arrangements which may be adopted are illustrated in FIGURE 6 which shows the variation with time of the beam-intensity control voltage, the waveforms in column I corresponding in each case to the conditions for one limiting amplitude of the signal to be recorded, while column II relates to the conditions for a medium signal level and column III to the conditions for the other extreme of amplitude.

Diagram 6*a* illustrates the variation in beam intensity control voltage when the duration D of each impulse causing the beam to change from a first to a second predetermined intensity is kept constant and the repetition rate is altered in accordance with the signal amplitude. It is of course possible for a higher repetition rate to correspond with a greater amplitude of signal or vice versa. Thus for one extreme value (white or synch. level) of the signal to be recorded the low pulse repetition rate of column I, where the inter-pulse interval amounts to $T_1$, is used, for the other extreme value the high pulse repetition rate shown in column III, where the inter-pulse interval is reduced to $T_3$, and for some intermediate signal level the repetition rate illustrated in column II is employed, the inter-pulse interval $T_2$ here having a duration intermediate between $T_1$ and $T_3$.

It is also possible, as illustrated by diagram 6*b*, to employ a constant pulse repetition rate and to alter the duration of the pulses in accordance with the signal amplitude. As illustrated in column I, the pulse period T is constant but the pulse duration corresponding to one extreme signal level has a small value $D_1$, for the medium signal level it has a greater value $D_2$ as illustrated in column II and for the other extreme value it has a still greater value $D_3$.

Finally, it is also possible to alter the repetition rate and the pulse duration simultaneously. This is preferably effected, as shown in FIGURE 6*c*, so that both pulse duration and pulse period vary in proportion to the signal amplitude. Thus for one extreme signal amplitude the pulse duration and pulse period have maximum values $D_1$, $T_1$ respectively, as shown in column I. For a medium signal level, both duration and period are reduced to lower values $D_2$, $T_2$ as shown in column II and for the other extreme signal amplitude the pulse duration and period have minimum values $D_3$, $T_3$ as shown in column III. Preferably the factors of proportionality are such that under all conditions the pulse period is at least approximately equal to twice the pulse duration.

In practice, because the beam of particles is not sharply defined, at least in the direction in which it traverse the track in recording, the transitions between regions of maximum and minimum density of record do not take place instantaneously as shown in the idealized diagrams of FIGURES 6*a* to 6*c*, but gradually. The limited reslou-tion of the record material itself also assists in preventing the recording of instantaneous transitions in the intensity of the recording beam of charged particles. If the time of transition from a maximum to a minimum value corresponds approximately to the pulse duration, then the intensity of the stream of charged particles incident upon the record track will vary in the manner shown in FIGURE 6*d* and the resultant record, if made visible, will be of the form shown in FIGURE 6*e*, which will be seen to be very similar to a record of a frequency-modulated sinusoidal signal.

Figure 6:
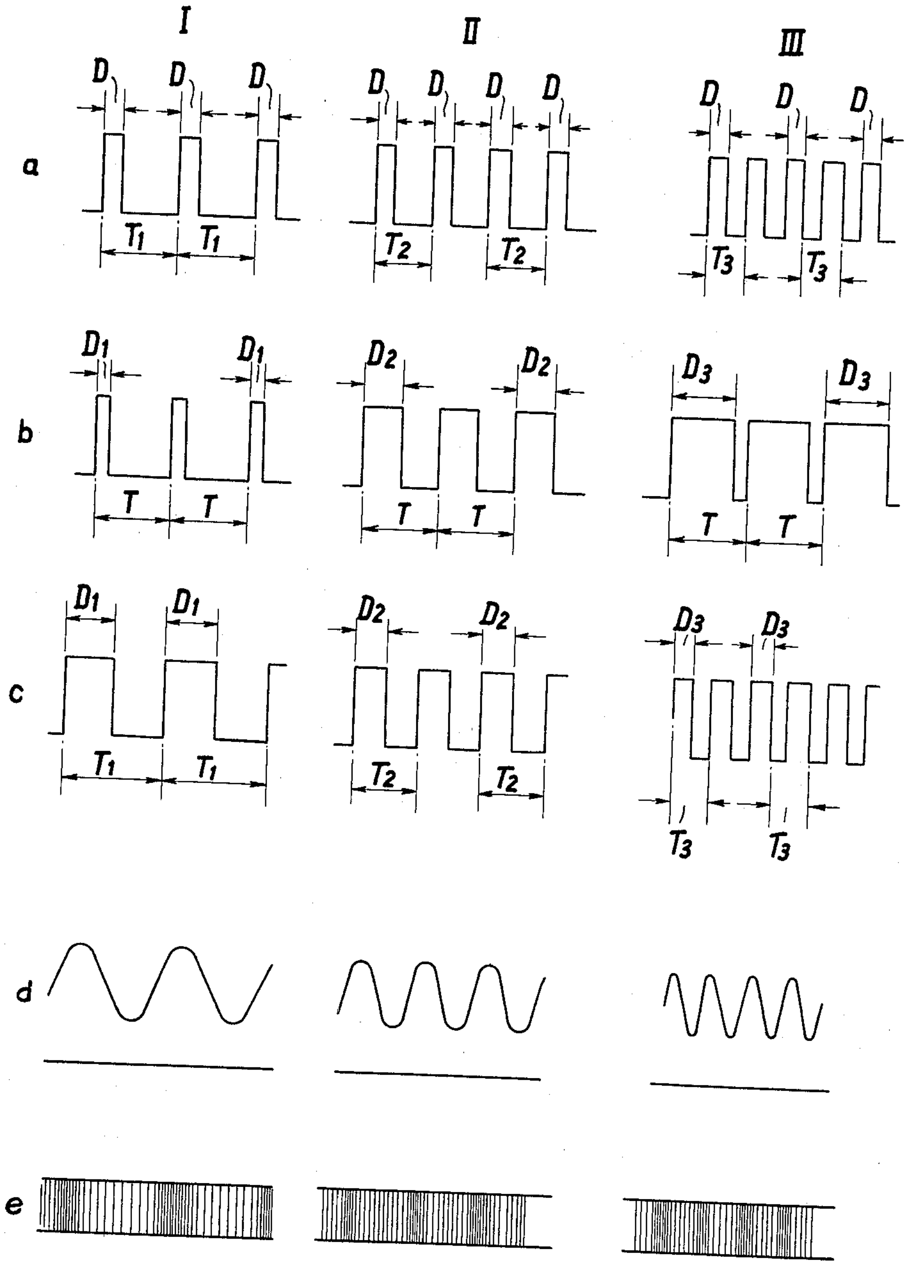

A consideration of FIGURE 6 will show that in cases where the recording process affects the transparency of the record material, the mean density of the record fluctuates with the signal amplitude in the case of records made as in FIGURES 6*a* or 6*b*, so that a visible image of the record signal is produced, whereas for the method of recording shown in FIGURE 6*c* the mean density of the record is independent of the signal amplitude and on the average all portions of the record will be at a uniform grey level.

For the special case where the method of recording is such as to change the optical density of the record material, a modulation of the recording beam as illustrated by FIGURES 6*a* or 6*b* thus yields an optical image of the recorded signals. For a signal recorded as in FIGURE 2, therefore, the recorded fields I and II correspond directly to the fields of the recorded television signal, while their aspect ratio of course depends upon the ratio of the track width to longitudinally velocity of the storage member during recording.

If, as in FIGURE 5, two successive picture lines are recorded on each track, then each complete television picture is divided among four fields. In FIGURE 5 the first recorded field I contains the 1st, 5th, 9th etc. lines of the television picture, field II lying alongside field I contains the 3rd, 7th, 11th etc. lines, field III lying below field I will contain the 2nd, 6th etc. lines and field IV lying below field II will contain the 4th, 8th etc. lines. If the method of recording is such as to change the tranparency of the record, then in the records produced by the methods illustrated in FIGURES 6*a* and 6*b* it is possible to identify the subject of the signals from the completed record, so that cutting and editing of the record is greatly simplified.

In order to obtain an efficient recording process it is advantageous from the record material to consist of discrete grains, such as the grains of a photographically sensitive material, the dimensions of which are substantially smaller than the area of the record member corresponding to one picture point, the nature of the material being such that particles incident on any such grains effect or initiate a persistent alteration of its characteristics. Thus a photographic film may be employed, such as is used also for the photographic recording of optical images. This enables use to be made of the known advantage of the photographic process, that even very low-energy particles or small amounts of electromagnetic radiation suffice to form in the grains of the photosensitive layer nuclei which during the subsequent photographic processing give rise to a blackening of the whole grain.

Similar advantages are also obtained by the use as the record material of a substance having ferroelectric properties. The effect of bombardment by charged particles is then to produce a charging of the material, as a result of which whole grains or segments of the record material become reoriented, which action is equivalent to a substantial amplification as compared with direct action upon the record material.

Suitable record materials do not as a rule possess the mechanical properties necessary to enable them to be used directly in the form of a tape. The record material will therefore usually be arranged on a carrier member or substrate of suitable form and preferably made of a synthetic material such as a polyester resin. When the record material is a ferroelectric material it may be advantageous to place a conductive layer, e.g. of evaporated material, between the substrate and the record material.

FIGURE 7 shows an embodiment of apparatus suitable for carrying out the method according to the invention. In this drawing, parts of the apparatus other than those essential to the understanding of the invention have been omitted in the interest of simplicity of illustration.

A conventional photographic film 41 is led from a feed spool (not shown) over a guide roller 42, a recording drum 43 and a further guide roller 44 and through a device 45 to a take-up spool (not shown). Recording is effected by means of an electron beam indicated by broken line 46. This originates in a thermionic cathode 47 and after being controlled in intensity by a control electrode 48 is focused by suitable conventional means (not shown) upon the surface of the film as it passes over recording drum 43. It is suitable for the electrons forming the beam to impinge upon the film with a velocity of about 300 to 3000 e.v. Preferably the beam is focused so that the size of the spot in which it impinges upon the film has an effective diameter corresponding approximately to the desired width of recor dtracks, though in some cases it may be advantageous for the width of the beam in the longitudinal direction of the film to be limited by means of a slotted diaphragm 49.

The beam is deflected in known manner, for example magnetically as shown, along a line transverse to the longitudinal direction of the film. To this end, deflector coils 50 are fed with a current of sawtooth waveform developed by a sawtooth current generator 21, so that the deflected electron beam 46 traverses a track with uniform velocity in one direction and then returns very rapidly to its initial position. As already explained, the repetition rate of the beam deflection process may with advantage be equal to the line frequency of the signal to be recorded, or it may be equal to an integral sub-multiple of the frequency. Preferably the deflection is performed at line frequency or at one half of this frequency.

The television signal to be recorded is received at an input terminal IN whence it passes on the one hand by way of a lead 22 to a synchronizing circuit 23 and on the other hand by way of a lead 24 to a modulator 25 in which it is used to vary the pulse repetition rate and/or pulse duration of pulses developed in a generator 26. The modulated periodic signal thus developed is applied to the control electrode 48 to cause the intensity of the electron beam to vary periodically between approximately constant maximum and minimum values, with a pulse repetition rate and/or pulse duration dependent upon the amplitude of the controlling signal. The record produced on the record member thus consists of portions of maximum and minimum density of which the lengths in the direction of the track transverse of the film and/or their separation correspond to the amplitude of the recorded signal.

During the subsequent processing of the film by developing and printing, the nuclei formed in the grains of the photolayer by the impinging electrons cause the affected grains to be blackened. In the present case, the minimum intensity of the recording beam of electrons is chosen to be practically zero; that is the electron beam is completely cut off during the periods of minimum control signal, so that it does not affect the photolayer and no blackening appears at these places after development. The photographic processing may be effected in the device 45 immediately subsequent to recording, so that the film 11 leaving device 45 already exhibits the recording in the form of differences of transparency.

After the film has been threaded-up in apparatus as described above, the space 27 in which the electron beam is produced and also the recording space 28 which contains recording roller 43, are evacuated by way of conduits 29, 30 leading to a vacuum pump (not shown). There are preferably provided in the path of the film before it enters and after it leaves recording space 28, preliminary vacuum chambers 31, 32. The degree to which chambers 31, 32 are evacuated by way of conduits 33, 34 is appropriately lower than the vacuum in the recording space 28, which again may be lower than that in electron beam space 27. A diaphragm 49 pierced by a slot 35 which is at most only slightly wider than the width of the electron beam passing through it, assists in the maintenance of a high vacuum in space 27.

It is possible for the width of slot 35 to correspond exactly to the width of the track and for the width of the beam incident upon the diaphragm to be somewhat greater than this, so that the width of the beam effective upon the film and the longitudinal portion of the track upon the film are very accurately determined by the diaphragm. When this arrangement is adopted, the successively recorded tracks may follow directly one after the other without any danger of overlapping between neighboring tracks. The best use is thus made of the available area of the record member.

It is recommended that cathode 47 be a tungsten cathode in order that damage due to ion bombardment caused by the rather poor available vacuum shall be avoided. In order to avoid optical exposure of the film used as the record member by the light emitted by the tungsten cathode, the path of the electron beam 46 instead of being rectilinear as shown, may be bent in a plane perpendicular to the plane of deflection, so that light from the cathode passing through the electrodes of the associated electron lens system does not fall upon the slit 35 in diaphragm 49 and cannot thus effect the film.

In a modification of apparatus as described above, entry of the record member into an evacuated space is avoided by closing slit 35 of diaphragm 49 by a Lenard window. Owing to the small width of the slit this window may be made very thin so that it does not produce an inadmissible scatter of the electrons in the recording beam.

In recording a television signal by the method according to the invention the signal is interrupted during the flyback periods of the beam deflection used in recording and also in the reproduction of the record.

According to an extension of the invention, there is provided a method of reproducing television signals discontinuously recorded by the method according to the invention in which signals representative of signal components bypassed during the recording process are stored and reproduced at the times proper to said bypassed components.

This is effected by passing signal components which occur at the beginning or end of a recorded track to a storage device in which they are retained and from which they are subsequently reproduced during the subsequent flyback period of the reproducing beam.

Where recording is effected by the method described in relation to FIGURES 6*a* or 6*c*, so that the repetition rate of the recorded pulses varies in accordance with the amplitude of the recorded signal, then resonant circuits of which the resonant frequencies correspond to the pulse repetition appropriate to the blanking and synchronizing levels may be used to store the bypassed signal components, the signal voltages appearing across them being gated into the reproduced signal at appropriate intervals. When necessary, the oscillatory voltages taken from the resonant circuits during the flyback periods may be passed through limiter circuits which maintain their amplitudes constant, When the flyback on the recording process is so long a duration that only the leading edge of the synchronizing impulse is recorded, then to form the trailing edge of the synchronizing pulse in the reconstructed signal the oscillatory circuit from which the appropriate signal frequency is taken may be heavily damped after an interval, subsequent to the reproduction of the leading edge, which interval is equal to the duration of the synchronizing pulse.

If, on the other hand, the flyback time in the recording process is short enough for both the leading and trailing edges of the synchronizing impulse to be recorded, then the store need only be used to supply the flyback period a signal of frequency corresponding to the synchronizing level required to be reconstructed.

Where the method of recording is such that an integral number of lines of the television signal are recorded in one track, for example as illustrated in FIGURE 4, then between every two lines recorded in each track there will be recorded a complete blanking interval with pre- and post-synchronizing blanking portions and the synchronizing pulse itself. In such as case it is not absolutely necessary to shorten the flyback period of the recording process so as to record part at least of the blanking interval occurring between the last line recorded in one track and the first recorded in the next. Instead, the bypassed blanking level and synchronizing signal may be reconstructed from signals corresponding to those level which were recorded in the middle of the track.

For this purpose the synchronizing signal is separated in known manner from the television signal and the signal components bypassed during the flyback interval of the recording process are reconstructed by repeating the recorded suppression and synchronizing signals so that the repeated signals occur at the proper times. In order that this shall be the case even when the time between successive synchronizing signals varies slightly, the synchronizing signal may be repeated from the preceding track by applying it to a delay line, the delay time of which is approximately equal to the duration of two lines of the television signal. Impulses appearing at the input and output of this delay line are compared in phase and a control voltage representing any lack of correspondence is used to readjust the delay time of the delay line so that the initial and delayed impulses coincide. If the repeated signals are then taken from the electrical centre of the delay line, then it is thus ensured that they will occur chronologically midway between the directly reproduced synchronizing signals.

The canning of a record produced by the method according to the invention in order to reproduce the recorded signals is preferably effected in a similar manner to the recording, that is by means of a deflected beam of electrically charged particles, such as an electron beam. In performing this scanning operation it is necessary, in order to obtain the maximum output signal, to ensure that the scanning beam follows each recorded track in turn and falls as little as possible upon adjacent tracks or spaces between tracks. It is therefore necessary to provide rigid synchronism between the longitudinal movement of the record member and the transverse deflection of the electron beam. A known method of obtaining such synchronism is to make use of an auxiliary signal recorded in the longitudinal direction of the store which is scanned as the record moves during reproduction by a stationary scanning element, such as beam of light or of electrons.

In accordance with a modification of the invention the transverse tracks may themselves be used as the auxiliary signal, preferably that part of the tracks which corresponds to the suppression interval lying at the beginning or end of each track.

If the transverse tracks recorded in accordance with the invention follow immediately upon one another, then on scanning a record in the longitudinal record no appreciable modulation of the stationary scanning element would be produced. In such a case, it becomes advantageous to arrange that, as shown in FIGURE 8, the electron beam 46 used for recording is limited by diaphragm 49 and that towards an end of each track the width of slot 35 is in the diaphragm is substantially reduced so that the width *b* of the emergent electron beam is reduced to one-half of its value during the remainder of the track. The form of the resultant record is shown in FIGURE 9, in which solid outline 35 represents the form of the slot in diaphragm 49 while broken outlines 36 show the form of tracks previously recorded on film 41. It will be seen that a scanning element positioned at 37 will provide a signal of the required form.

In order to keep the scanning beam properly aligned with the recorded tracks, the speed of the motor driving the tape and its angular position may be controlled by a signal derived from the device scanning the record member longitudinally.

Alternatively, if the scanning beam is not limited by a slotted diaphragm, but sharply focused, then the derived error signal may be used to deflect the beam in the longitudinal direction into correct alignment with the tracks. This arrangement has the advantage of operating substantially without lag.

While the invention has been illustrated and described in special embodiments, it is not intended to be limited to the details shown, since various modifications and structural changes may be made without departing in any way from the spirit of the present invention.

What is claimed as new and is desired to be secured by Letters Patent is:

1. A method of recording a discontinuous video signal comprising periodically repetitive first portions containing variable information and other periodically repetitive portions intercalated between said first portions and containing a uniform type of information, comprising the steps of producing a beam of charged particles; modulating said beam by periodically varying then intensity of said beam between predetedmined substantially constant maximum and minimum values so as to form a train of intensity pulses having duration characteristics and frequency characteristics; varying at least one of said characteristics by modulation in accordance with the amplitudes of the signal to be recorded; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal; and cyclically deflecting, during said recording, said beam transversely of said elongated record carrier with a repetition period equal to the duration of an integral number of signal periods of said discontinuous signal to be recorded.

2. A method of recording a discontinuous video signal comprising periodically repetitive first portions containing variable information and other periodically repetitive portions intercalated between said first portions and containing a uniform type of information, comprising the steps of producing a beam of charged particles; modulating said beam by periodically varying the intensity of said beam between predetermined substantially constant maximum and minimum values so as to form a train of intensity pulses having duration characteristics and frequency characteristics, the duration of said pulses being substantially constant; varying the frequency thereof by modulation in accordance with the amplitudes of the signal to be recorded; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal; and cyclically deflecting, during said recording, said beam transversely of said elongated record carrier with a repetition period equal to the duration of an integral number of signal periods of said discontinuous signal to be recorded.

3. A method of recording a discontinuous video signal comprising periodically repetitive first portions containing variable information and other periodically repetitive portions intercalated between said first portions and containing a uniform type of information, comprising the steps of producing a beam of charged particles; modulating said beam by periodically varying the intensity of said beam between predetermined substantially constant maximum and minimum values so as to form a train of intensity pulses having duration characteristics and frequency characteristics, the frequency of said pulses being substantially constant; varying the duration thereof by modulation in accordance with the amplitudes of the signal to be recorded; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal; and cyclically deflecting, during said recording, said beam transversely of said elongated record carrier with a repetition period equal to the duration of an integral number of signal periods of said discontinuous signal to be recorded.

4. A method of recording a discontinuous video signal comprising periodically repetitive first portions containing variable information and other periodically repetitive portions intercalated between said first portions and containing a uniform type of information, comprising the steps of producing a beam of charged particles; modulating said beam by periodically varying the intensity of said beam between predetermined substantially constant maximum and minimum values so as to form a train of intensity pulses having duration characteristics and frequency characteristics; varying both said characteristics by modulation in accordance with the amplitudes of the signal to be recorded; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal; and cyclically deflecting, during said recording, said beam transversely of said elongated record carrier with a repetition period equal to the duration of an integral number of signal periods of said discontinuous signal to be recorded.

5. A method of recording a discontinuous video signal comprising periodically repetitive first portions containing variable information and other periodically repetitive portions intercalated between said first portions and containing a uniform type of information, comprising the steps of producing a beam of charged particles; modulating said beam by periodically varying the intensity of said beam between predetermined substantially constant maximum and minimum values so as to form a train of intensity pulses having duration characteristics and frequency characteristics; varying both said characteristics in accordance with the amplitudes of said signal, the duration of said pulses being varied inversely in relation to the frequency thereof so that the durations of said pulses are substantially equal to the intervals therebetween; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal; and cyclically deflecting, during said recording, said beam transversely of said elongated record carrier with a repetition period equal to the duration of an integral number of signal periods of said discontinuous signal to be recorded.

6. A method of recording a discontinuous video signal comprising periodically repetitive first portions containing variable information and other periodically repetitive portions intercalated between said first portions and containing a uniform type of information including a horizontal synchronization pulse and a suppression level, comprising the steps of producing a beam of charged particles; modulating said beam by periodically varying the intensity of said beam between predetermined substantially constant maximum and minimum values so as to form a train of intensity pulses having duration characteristics and frequency characteristics; varying at least one of said characteristics by modulation in accordance with the amplitudes of the signal to be recorded; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal; and cyclically deflecting, during said recording, said beam transversely of said elongated record carrier with a repetition period equal to the duration of the repetition period of said discontinuous signal to be recorded, the timing and duration of the flyback stroke of said deflecting operation being so chosen that signal portions of said discontinuous signal corresponding to the level of said horizontal synchronization pulse and to said suppression level are recorded at the beginning and at the end of each beam deflection.

7. A method of recording a discontinuous video signal comprising periodically repetitive first portions containing variable information and other periodically repetitive portions intercalated between first portions and containing a uniform type of information including line blanking periods containing a horizontal synchronization pulse and a suppression level, comprising the steps of producing a beam of charged particles; modulating said beam by periodically varying the intensity of said beam is periodically varied between predetermined substantially constant maximum and minimum values so as to form a train of intensity pulses having duration characteristics and frequency characteristics; varying at least one of said characteristics by modulation in accordance with the amplitudes of the signal to be recorded; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal; and cyclically deflecting, during said recording, said beam transversely of said elongated record carrier with a repetition period equal to the duration of an integral multiple of the repetition period of said discontinuous signal to be recorded, whereby each line of the resulting record contains, in addition to the recording of said first portions of said discontinuous signal, at least one of said blanking periods.

8. Apparatus for recording a discontinuous video signal on an elongated record carrier having characteristics which are subject to distinctive alterations thereof in its individual area elements upon impingement thereon of a beam of charged particles of predetermined energy, a plurality of such alterations constituting a record, comprising, in combination, means for producing a beam of charged particles adapted to impinge on the record carrier; first modulating means for varying periodically the intensity of said beam between predetermined substantially constant maximum and minimum values so as to form a train of intensity pulses having duration characteristics and frequency characteristics; second modulatign means controllable by said signal to be recorded for varying at least one of said characteristics by modulation in accordance with the amplitudes of the signal to be recorded; lead-in means adapted to move the elongated record carrier in its longitudinal direction at a predetermined speed across the path of said beam, whereby alterations of the characteristic condition of area elements thereof impinged upon by said beam are produced depending upon said modulation of said beam; and deflector means controllable by said signal to be recorded for cyclically deflecting said beam, transversely of said elongated record carrier at a predetermined repetition period so as to cause a recording of said signal along a plurality of consecutive lines transverse of said elongated record carrier.

9. Apparatus for recording a discontinuous video signal on an elongated record carrier having characteristics which are subject to distinctive alterations thereof in its individual area elements upon impingement thereon of a beam of charged particles of predetermined energy, a plurality of such alterations constituting a record, comprising, in combination, means for producing a beam of charged particles adapted to impinge on the record carrier and including slotted stop means arranged athwart of said beam adjacent to the point of impingement of said beam on said record carrier, for limiting at least the dimension of said beam in longitudinal direction of the record carrier; first modulating means for varying periodically the intensity of said beam between predetermined substantially constant maximum and minimum values so as to form a train of intensity pulses having duration characteristics and frequency characteristics; second modulating means controllable by said signal to be recorded for varying at least one of said characteristics by modulation in accordance with the amplitudes of the signal to be recorded; lead-in means adapted to move the elongated record carrier in its longitudinal direction at a predetermined speed across the path of said beam, whereby alterations of the characteristic condition of area elements thereof impinged upon by said beam are produced depending upon said modulation of said beam; and deflector means controllable by said signal to be recorded for cyclically deflecting said beam, during the movement of said record carrier across said beam, transversely of said elongated record carrier at a predetermined repetition period so as to cause a recording of said signal along a plurality of consecutive lines transverse of said elongated record carrier.

10. Apparatus for recording a discontinuous video signal on an elongated record carrier having characteristics which are subject to distinctive alterations thereof in its individual area elements upon impingement thereon of a beam of charged particles of predetermined energy, a plurality of such alterations constituting a record, comprising, in combination, means for producing a beam of electrons and including an evacuable chamber surrounding said means and substantially the entire path of said beam up to a point adjacent to the point of impingement of said beam on the record carrier; first modulating means for varying periodically the intensity of said beam between predetermined substantially constant maximum and minimum values so as to form a train of intensity pulses having duration characteristics and frequency characteristics; second modulating means controllable by said signal to be recorded for varying at least one of said characteristics by modulation in accordance with the amplitudes of the signal to be recorded; lead-in means adapted to move the elongated record carrier in its longitudinal direction at a predetermined speed across the path of said beam, whereby alterations of the characteristic condition of area elements thereof impinged upon by said beam are produced depending upon said modulation of said beam, said lead-in means including at least one vacuum chamber surrounding portions of the path of the record carrier at, before and after the point of impingement of said beam thereon; and deflector means controllable by said signal to be recorded for cyclically deflecting said beam, during the movement of said record carrier across said beam, transversely of said elongated record carrier at a pedetermined repetition period so as to cause a recording of said signal along a plurality of consecutive lines transverse of said elongated record carrier.

11. Apparatus for recording a discontinuous signal on an elongated record carrier having characteristics which are subject to distinctive alterations thereof in its individual area elements upon impingement thereon of a beam of charged particles of predetermined energy, a plurality of such alterations constituting a record, comprising, in combination, means for producing a beam of electrons and including an evacuable chamber surrounding said means and substantially the entire path of said beam up to a point adjacent to the point of impingement of said beam on the record carrier; first modulating means for varying periodically the intensity of said beam between predetermined substantially constant maximum and minimum values so as to form a train of intensity pulses having duration characteristics and frequency characteristics; second moduating means controllable by said signal to be recorded for varying at least one of said characteristics by modulation in accordance with the amplitudes of the signal to be recorded; lead-in means adapted to move the elongated record carrier in its longitudinal direction at a predetermined speed across the path of said beam, whereby alterations of the characteristic condition of area elements thereof impinged upon by said beam are produced depending upon said modulation of said beam, said lead-in means including at least one vacuum chamber surrounding portions of the path of the record carrier at, before and after the point of impingement of said beam thereon, slotted stop means being arranged to separate said evacuable chamber and said vacuum chamber, and located athwart of said beam adjacent to the point of impingement of said beam on the record carrier, for limiting at least the dimension of said beam in longitudinal direction of said record carrier; and deflector means controllable by said signal to be recorded for cyclically deflecting said beam, during the movement of said record carrier across said beam, transversely of said elongated record carrier at a pedetermined repetition period so as to cause a recording of said signal along a plurality of consecutive lines transverse of said elongated record carrier.

12. Apparatus for recording a discontinuous video signal comprising periodically repetitive first portions containing variable information and second periodically repetitive portions intercalated between said first portions and containing a uniform type of information on an elongated record carrier having characteristics which are subject to distinctive alterations thereof in its individual area elements upon impingement thereon of a beam of charged particles of predetermined energy, a plurality of such alterations constituting a record, comprising, in combination, means for producing a beam of charged particles adapted to impinge on the record carrier; first modulating means for varying periodically the intensity of said beam between predetermined substantially constant maximum and minimum values so as to form a train of intensity pulses having duration characteristics; second modulating means controllable by said signal to be recorded for varying said duration characteristics by said modulation in accordance with the amplitudes of the signal to be recorded; lead-in means adapted to move the elongated record carrier in its longitudinal direction at a predetermined speed across the path of said beam, whereby alterations of the characteristic condition of area elements thereof impinged upon by said beam are produced depending upon said modulation of said beam; deflector means controllable by said signal to be recorded for cyclically deflecting said beam, during the movement of said record carrier across said beam, transversely of said elongated record carrier at a predetermined repetition period so as to cause a recording of said signal along a plurality of consecutive lines transverse of said elongated record carrier; and a delay line having an electrically variable delay period approximately equal to the period of two repetition periods of said signal to be recorded, means for applying to said line periodically recurrent signal components of the type of said second portions of said signal to be recorded, means for comparing in phase the input and output signals appearing at the two ends of said line to drive an error signal, means for applying said error signal to adjust the delay period of said line to obtain phase synchronism between said input and output signals, means for deriving further periodically recurrent signal components from the electrical centre of said line and means for combining said further components with said discontinuous signal.

13. A method of recording a discontinuous video signal comprising periodically repetitive first portions containing variable information and other periodically repetitive portions intercalated between said first portions and containing a uniform type of information, comprising the steps of producing a beam of charged particles; modulating said beam by periodically varying the intensity of said beam between predetermined substantially constant maximum and minimum values so as to form a train of intensity pulses having duration characteristics and frequency characteristics, the frequency of said pulses being substantially constant; varying the duration thereof by modulation in accordance with the amplitudes of the signal to be recorded; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal, the dimension of the areas of said material affected by said alteration, measured in longitudinal direction of said record carrier, varying in proportion to said duration of said pulses; and cyclically deflecting, during said recording, said beam transversely of said elongated record carrier with a repetition period equal to the duration of an integral number of signal periods of said discontinuous signal to be recorded.

14. A method of recording a discontinuous video signal comprising periodically repetitive first portions containing variable information and other periodically repetitive portions intercalated between said first portions and containing a uniform type of information including a constant reference level, comprising the steps of producing a beam of charged particles; modulating said beam by periodically varying the intensity of said beam between predetermined substantially constant maximum and minimum values so as to form a train of intensity pulses having duration characteristics and frequency characteristics; varying at least one of said characteristics by modulation in accordance with the amplitudes of the signal to be recorded; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal; and cyclically deflecting, during said recording, said beam transversely of said elongated record carrier with a repetition period equal to the duration of the repetition period of said discontinuous signal to be recorded, the timing and duration of the flyback stroke of said deflecting operation being so chosen that signal portions of said discontinuous signal corresponding to said constant reference level are recorded at the beginning and at the end of each beam deflection.

15. A method of recording a discontinuous video signal comprising periodically repetitive first portions containing variable information and other periodically repetitive portions intercalated between said first portions and containing a uniform type of information including a constant reference level, comprising the steps of producing a beam of charged particles; modulating said beam by periodically varying the intensity of said beam between predetermined substantially constant maximum and minimum values so as to form a train of intensity pulses having duration characteristics and frequency characteristics; varying at least one of said characteristics by modulation in accordance with the amplitudes of the signal to be recorded; moving an elongated record carrier in its longitudinal direction at a predetermined speed across the path of said beam; causing, by the action of said beam, in the material of at least a part of said record carrier persistent distinctive alterations of a characteristic condition thereof in its individual area elements, said alterations depending upon said modulation of said beam and representing a recording of said signal; and cyclically deflecting, during said recording, said beam transversely of said elongated record carrier with a repetition period equal to the duration of an integral multiple of the repetition period of said discontinuous signal to be recorded, whereby each line of the resulting record contains, in addition to the recording of said first portions of said discontinuous signal, a recording of said constant reference level.

References Cited by the Examiner

UNITED STATES PATENTS

| | | | |
|---|---|---|---|
| 2,291,723 | 8/1942 | Jensen | 178—7.2 |
| 2,297,398 | 9/1942 | Fries | 178—6.6 |
| 2,716,048 | 8/1955 | Young | 346—110 |
| 3,137,768 | 6/1964 | Mullin | 178—6.7 |

DAVID G. REDINBAUGH, *Primary Examiner.*

ROY LAKE, *Examiner.*